United States Patent
Mutschler, Jr. et al.

[11] Patent Number: 5,718,531
[45] Date of Patent: Feb. 17, 1998

[54] LOW SHOCK RELEASE DEVICE

[75] Inventors: Edward Charles Mutschler, Jr., Wexford, Pa.; Philip Olikara, Brookfield, Wis.; David George Reed, Langhorne, Pa.

[73] Assignee: Lockheed Martin Corporation, East Windsor, N.J.

[21] Appl. No.: 589,487

[22] Filed: Jan. 22, 1996

[51] Int. Cl.$^6$ ............... F16B 4/00; C22K 1/00
[52] U.S. Cl. ............. 403/28; 294/82.26; 294/99.1; 294/103.1; 294/119.1; 403/32; 403/404
[58] Field of Search ............. 244/118.1, 131; 294/82.26, 86.4, 99.1, 103.1, 119.1; 403/28, 32, 179, 404; 410/77, 80, 81

[56] References Cited

U.S. PATENT DOCUMENTS

| | | | |
|---|---|---|---|
| 2,161,082 | 6/1939 | Ovtschinnikoff | 294/82.26 X |
| 3,034,289 | 5/1962 | Stott et al. | 294/82.26 X |
| 4,173,366 | 11/1979 | Mattei et al. | 294/82.26 |
| 4,553,393 | 11/1985 | Ruoff | 60/528 |
| 4,753,465 | 6/1988 | Dalby | 292/32 |
| 5,248,233 | 9/1993 | Webster | 411/433 |
| 5,312,152 | 5/1994 | Woebkenberg, Jr. et al. | 294/86.4 |
| 5,344,506 | 9/1994 | DeAngelis | 148/402 |

FOREIGN PATENT DOCUMENTS

| | | | |
|---|---|---|---|
| 3327060 | 2/1985 | Germany | 294/119.1 |
| 6440246 | 2/1989 | Japan . | |
| 1142444 | 2/1969 | United Kingdom | 294/82.26 |

OTHER PUBLICATIONS

"SP Series Pin Pullers," Hi-Shear Corporation Data Sheet, 1976.

*Primary Examiner*—Kenneth J. Dorner
*Assistant Examiner*—Andrea Chop
*Attorney, Agent, or Firm*—Clement A. Berard, Jr.

[57] ABSTRACT

A release device is actuated to release a workpiece by operation of either of two elongated shape memory metal alloy (SMMA) members. Each SMMA member has on one end a feature that engages a fitting on the workpiece, while its other end is mounted to a housing. A heater on each SMMA member raises its temperature to a transition temperature at which it returns to an unstressed (e.g. shorter) length, thereby releasing the workpiece. The two SMMA elements may be disposed in opposite directions from the housing or may be coaxial or offset and disposed in the same direction.

20 Claims, 3 Drawing Sheets

LOW SHOCK RELEASE DEVICE

The present invention generally relates to release devices.

BACKGROUND OF THE INVENTION

In many applications, an article or structure is held or bound to another by a cable or a rod under tension. It could be a load tied down to a truck bed, cargo secured on a ship or aircraft, or a structure to be deployed or released from an aircraft or a spacecraft. In each case, the article to be held is put into a desired position, the cable or rod is placed into securing position with both ends secured, and is then placed under tension, as by a turnbuckle, winch or other tensioning device. When it is desired to release the article, the tensioned cable or rod is either cut or released at its end.

One prior art arrangement to accomplish such release employs a pyrotechnically-actuated pin puller, such as an SP Series pin puller available from Hi-Shear Corporation of Torrance, Calif. Such prior art release arrangements have the disadvantages of generating a large mechanical shock upon actuation, due both to the firing of the pyrotechnic (explosive) actuator and to the sudden release of the tension of the cable or rod, and of contamination from the products of combustion.

Another prior art locking mechanism described in U.S. Pat. No. 4,753,465 to Dalby employs a 55-Nitinol rod as the single actuating member, a so-called "transducer rod". While eliminating the pyrotechnic shock, the Dalby mechanism can still generate a mechanical shock upon the sudden release of the tension of the second connection. Dalby suffers from a single-point failure mechanism because the single transducer rod (e.g., 81 of FIG. 2) must function properly to release the secured structure. In the embodiments of FIGS. 4 and 6 of Dalby which employ two transducer rods 36—36, both of these rods must operate (contract) for the locking mechanism to release the secured structure. Thus, these locking mechanisms of Dalby have not one, but two undesirable single-point failure modes.

SUMMARY OF THE INVENTION

Accordingly, there is a need for a release device that has low mechanical shock upon release and has redundant actuators. The present invention comprises first and second elongated heat contractible members that contract when heated to a transition temperature and have an engaging feature adapted for engaging a workpiece. Means mounts the first and second elongated heat contractible members with a movable engaging feature positioned to engage the workpiece. Heating means are coupled to heat the first and second elongated members to the transition temperature.

DESCRIPTION OF THE PREFERRED EMBODIMENTS

Figure 1:
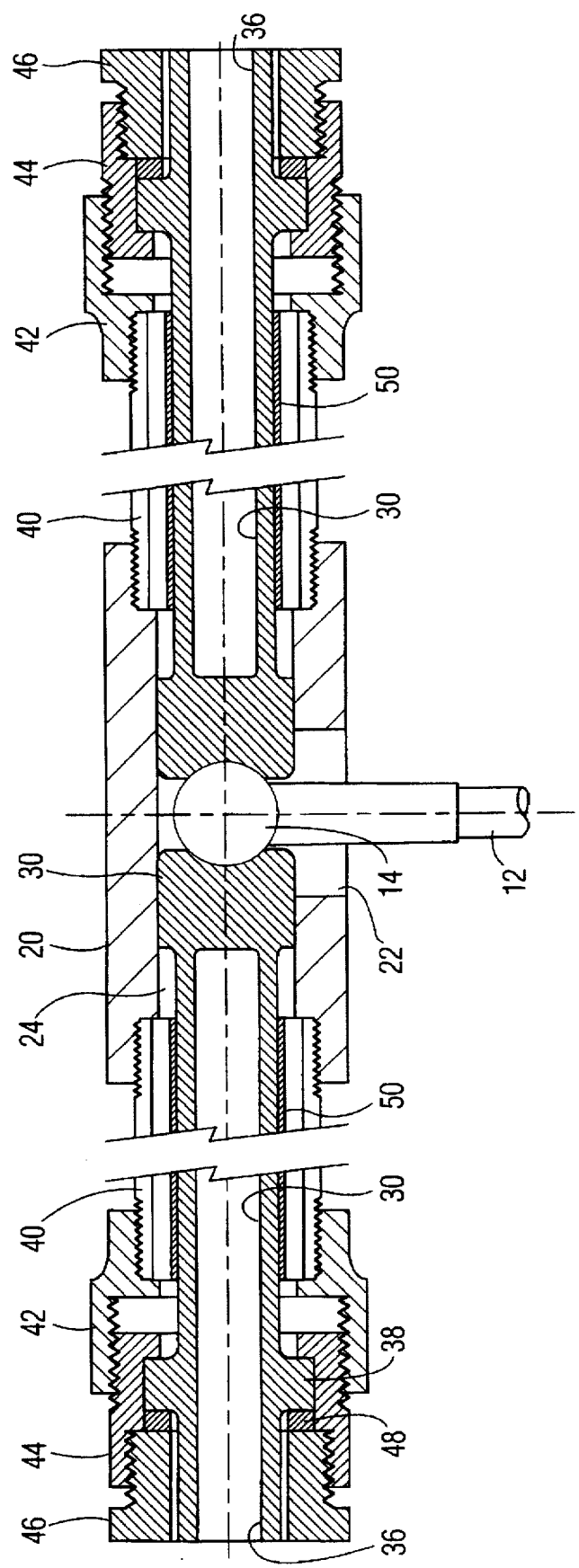
FIG. 1 is a diagram of an apparatus including an embodiment of the invention.

In FIGS. 1 and 2, a workpiece 12, which may be a rod or a cable, has an engaging fitting 14, for example, a spherical fitting. Housing 20 has a cavity 22 for receiving fitting 14 wherein fitting 14 is engaged by recessed engaging features 34 at the ends 32 of two shape memory metal alloy (SMMA) members 30. Engaging features 34 may be recesses that are spherical or conical. The ends 32 of SMMA members 30 are slidably mounted in a bore 24 in housing 20 that is in communication with cavity 22. Because SMMA members 30 and their mounting arrangement yet to be described is the same for the left hand and right hand sides of the embodiment of FIG. 1, like numbers are assigned to corresponding elements on left- and right-hand sides and the description below applies to both sides.

SMMA materials are well known in the art and are described in, for example, U.S. Pat. Nos. 5,312,152 issued to Woebkenberg et al. and 5,344,506 issued to DeAngelis, which are hereby incorporated herein by reference. 55-Nitinol is a desirable SMMA material. It is noted that an SMMA material is an alloy and is not a bimetal, which is an assembly of two or more distinct elements that have different coefficients of thermal expansion.

SMMA member 30 is a tube as illustrated in FIG. 1, but may be a rod, bar or of other suitable shape and cross-section. SMMA member 30 lies within mounting tube 40 that is fixedly attached, e.g., as by a threaded connection, to housing 20, preferably concentric with bore 24 therein. End fitting 42 is threaded to the other end of tube 40 for convenience in obtaining an increased diameter thread to receive clamp nut 44. Flange 38 of SMMA member 30 and O-spacer 48 are clamped between clamp nut 44 and end nut 46 for securing end 36 of member 30 in fixed physical relationship with respect to housing 20 through tube 40. The assembly of clamp nut 44, end nut 46 and member 30 is threaded into end fitting 42 to engage and be tightened against fitting 14, thereby to firmly secure it in place between faces 32 of the two SMMA members 30.

SMMA member 30, for example, a 55-Nitinol tube, is mechanically deformed, i.e. elongated, before installation. Although up to 8% elongation could be used, about 5% is usually employed. When the SMMA material is heated to its transition temperature, for example, about 90°–100° C., it "remembers" its original shape and length, and returns to it permanently. The mechanical deformation—heating to transition temperature—restoration to original shape and length cycle can be repeated many times, thereby providing the desirable feature of being able to test the release device apart from finally expending it in use, as is the case with one-time pyrotechnically-actuated devices.

Figure 2B:
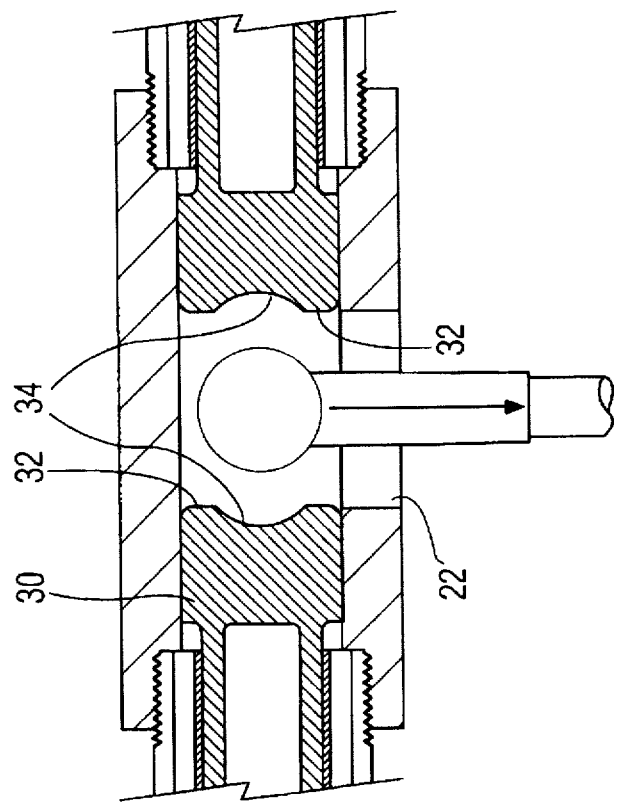
FIGS. 2A and 2B are details of a portion of the embodiment of FIG. 1, showing engaged and disengaged positions, respectively.
Figure 2A:
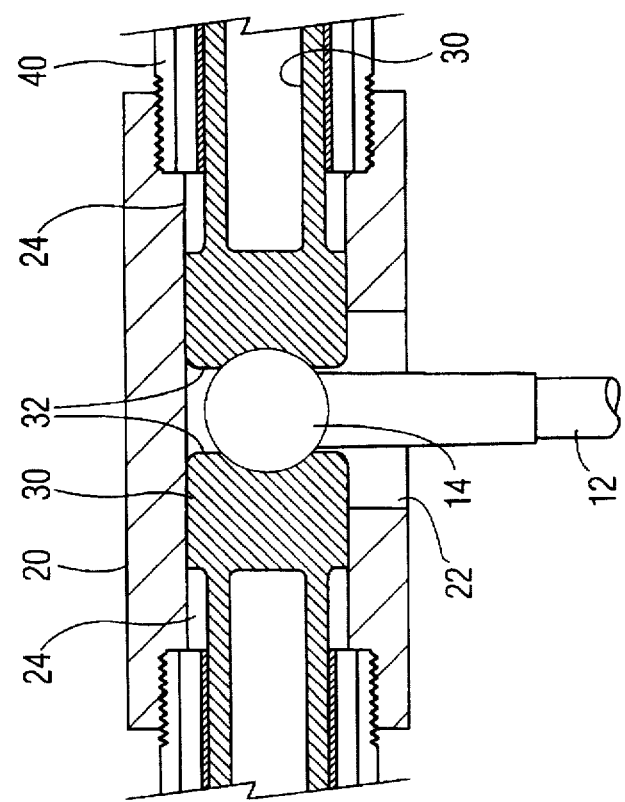

The engaged or clamped positions of SMMA members 30, housing 20 and fitting 14 are shown in FIG. 2A.

Two heating elements 50 are respectively in close thermal coupling with the two SMMA members 30 for heating them to their transition temperatures. The two heaters may be operated simultaneously, serially or independently, depending upon whether it is desired to release cable or rod 12 by having both SMMA members actuate at about the same time or at different times.

Each SMMA member 30 is sized so that its dimensional change, e.g. contraction, alone is sufficient to create sufficient clearance between the faces 32 of the two SMMA members 30 to disengage fitting 14, as shown in FIG. 2B, and allow it to be withdrawn through cavity 22. For example, if cable 12 has a diameter of ⅛", then fitting 14 may have a diameter of about ¼". Because the faces 32 are about ⅛" apart when fitting 14 is engaged, if either face 32 retracts by ⅛" or more, there will be ¼" clearance between the two faces 32 and fitting 14 is free to be withdrawn into and/or through cavity 22. In practice, however, greater clearance is provided so as to ensure that fitting 14 will freely pass between the two faces 32 and cavity 22. If a 3/16" clearance is desired, then SMMA member 30 would have an operative length of about 3¾" based on a 5% contraction.

Thus, it is seen that fitting 14 will be released if either SMMA member 30 actuates, providing a double redundancy to greatly increase the probability of successful actuation. This is in contrast to the prior art arrangement shown in FIG. 4 or 6 of the Dalby patent where both "transducers" must actuate for successful operation. Said another way, if either of Dalby's actuators fails, whether from electrical heater failure or mechanical binding, his device fails.

Figure 3:
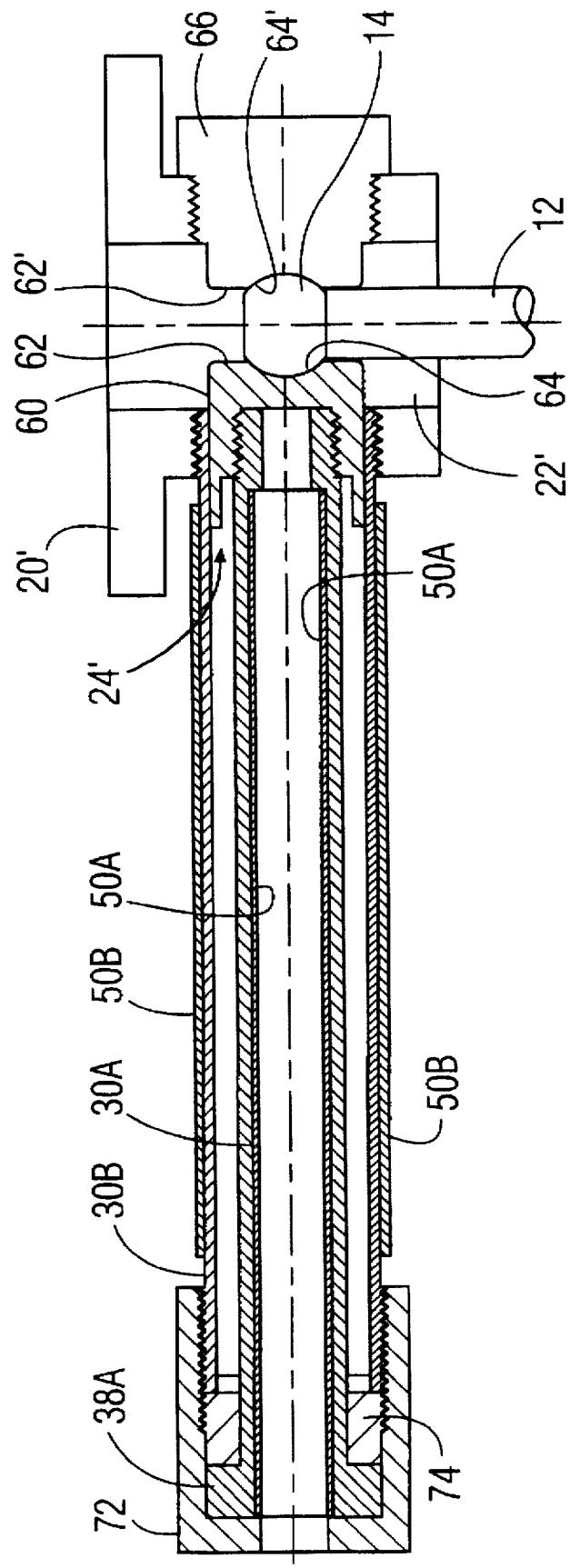
FIG. 3 is a diagram of an alternative arrangement including an embodiment of the invention.

In an alternative embodiment, FIG. 3, both SMMA members 30A, 30B are disposed in the same direction with respect to housing 20'. End nut 66 is threaded into housing 20' for engaging feature 64' in face 62' to engage fitting 14 in like manner to engaging feature 64 in face 62 of fitting 60. Engaging fitting 60 may be fabricated as a separate piece affixed to SMMA rod 30A or may be fabricated integrally therewith, but in either case is slidable within bore 24'. SMMA member 30A, its mounting arrangement and operation are as described above in relation to FIGS. 1 and 2, however, it is secured at its left end by engaging flange 38A between end fitting 72 and clamp nut 74 which function similarly to fitting 42 and nuts 44 and 46 as described above, except that fitting 72 and housing 20' are connected by tubular SMMA member 30B' rather than by fixed length tube 40 as shown in FIG. 1. So that face 62 of member 60 will move leftward upon actuation, SMMA member 30B is mechanically deformed before installation by compressing its length by about 5%, so that when SMMA member 30B is heated by heater 50B to its transition temperature, it will elongate to its undeformed length, thereby moving fitting 72 leftward with respect to housing 20'. This movement causes member 30A and fitting 60 to also move leftward thereby releasing fitting 14 to pass by and/or through cavity 22'. Likewise, when SMMA member 30A is heated to its transition temperature by heater 50A, member 30A contracts to its undeformed length so that its right end and fitting 60 move leftward with respect to housing 20', thereby releasing fitting 14.

The housings, tubes, fittings, nuts, and other mechanical elements described herein may be fabricated of any suitable material, for example, aluminum, stainless steel or titanium, compatible with the intended application of the release device.

Other alternative embodiments as may be evident to those of skill in the art are contemplated within the scope of the present invention which is limited only by the claims following. For example, SMMA members 30, 30A or 30B could be fabricated in one piece or could be fabricated in several pieces. Such members could comprise an SMMA tube portion having a face piece affixed to one end and a mounting feature, such as flange 38, affixed at the other end, such as by a threaded coupling.

Similarly, heater elements 50, 50A or 50B could be electrical resistance heaters formed of heater wire (e.g. nichrome wire) wound over SMMA member 30, or a flexible flat resistance heater, such as those available from Minco Company of Minneapolis, Minn. Alternatively, a flexible flat resistance heater could be held against SMMA members 30, 30A or 30B by a beryllium copper or other metal clip or could be bonded to such metal clip that is in thermal contact with such SMMA member. Still further, the SMMA members could be heated by passing a hot fluid over the member, such as by adding inlet and outlet ports to tube 40.

The coaxial SMMA members 30A, 30B of FIG. 3 could be arranged to be offset from each other and arranged side by side. Engaging feature 64 would remain slidably mounted in bore 24' and the right end of member 30B would be fixedly attached to housing 20'. The respective left ends of members 30A and 30B would be fixedly coupled to each other, such as by a clamp or a fitting having two threaded elements for engaging threads on the left end of said members.

Further, the shapes of fitting 14 and the engaging features engaging fitting 14 may be designed to allow for releasing more gradually any tension in rod or cable 12. For example, the portion of fitting 14 proximate cable 12 may be conical and the portion distal may be spherical. The engaging features 34 in faces 32 would be a corresponding combination of conical and spherical portions.

Still further, the engaging feature on the workpiece could be a recess, such as a machined groove or bore, and the engaging feature on the SMMA member could be raised, such as a flange or pin.

What is claimed is:

1. Apparatus for releasably engaging a workpiece having an engaging feature, comprising:

first and second elongated members including a shape memory metal alloy material, each of said elongated members changing from an engaging length to a disengaging length when said shape memory metal alloy material is heated to a transition temperature, each of said elongated members having respective first and second ends and an elongated direction, at least one of said elongated members having an engaging feature on its first end adapted for engaging and disengaging the engaging feature of the workpiece;

mounting means having a cavity and coupled to one end of each of said first and second elongated members for mounting said first and second elongated members with at least the first end of said one elongated member in the cavity of said mounting means, the first end of said one elongated member being positioned in said cavity for engaging the engaging feature of the workpiece when said first and second elongated members have said engaging length and for disengaging the engaging feature of the workpiece when either one of said first and second elongated members changes to said disengaging length;

first heating means coupled to said first elongated member for heating said first elongated member to said transition temperature; and second heating means coupled to said second elongated member for heating said second elongated member to said transition temperature.

2. The apparatus of claim 1 wherein said first and second elongated members are mounted to extend in opposite directions from said mounting means and have their respective elongated directions lying substantially along a common axis.

3. The apparatus of claim 2 wherein said mounting means for mounting comprises:

a housing member wherein the cavity of said mounting means has a bore for receiving the respective first ends of said first and second elongated members;

a first coupling structure fixedly coupled to the second end of said first elongated member and to said housing member; and a second coupling structure fixedly coupled to the second end of said second elongated member and to said housing member.

4. The apparatus of claim 3 wherein said first coupling structure includes a tubular member having a first end fixedly attached to said housing member and having a second end, and a fitting member fixedly attached to the second end of said tubular member and to the second end of said first elongated member.

5. The apparatus of claim 4 wherein said first elongated member lies within said tubular member.

6. The apparatus of claim 1 wherein the engaging length of said first and second elongated members is longer than the disengaging length thereof.

7. The apparatus of claim 1 wherein said first and second elongated members are mounted to extend in the same direction with respect to said mounting means and have their respective elongated directions lying along substantially parallel axes.

8. The apparatus of claim 7 wherein said mounting means for mounting comprises:
- a housing member wherein the cavity of said mounting means has a bore for receiving the first end of at least said first elongated member; and
- a coupling structure fixedly coupled to the respective second ends of said first and second elongated members.

9. The apparatus of claim 1 wherein the engaging length of one of said first and second elongated members is longer than the disengaging length of said one of said first and second elongated members and the engaging length of the other of said elongated members is shorter than the disengaging length of said other of said first and second elongated members.

10. The apparatus of claim 1 wherein said first and second elongated members are tubes.

11. The apparatus of claim 1 wherein said shape memory metal alloy is 55-Nitinol.

12. The apparatus of claim 1 wherein the engaging feature of at least one of said first and second elongated members has a shape for releasing tension gradually.

13. The apparatus of claim 12 wherein said shape is a tapered shape.

14. A release device for releasing a workpiece having an enlarged engaging fitting thereon comprising:
- a housing member having a cavity for receiving the engaging fitting of said workpiece and having a bore communicating with said cavity;
- first and second elongated shape memory metal alloy members, each of said elongated shape memory metal alloy members having been deformed by increasing its length and capable of returning to an undeformed length when heated to a transition temperature, each of said elongated shape memory metal alloy members having on a first end a recessed engaging feature adapted for engaging the engaging fitting of said workpiece, wherein respective first ends of said first and second elongated shape memory metal alloy members are in the bore of said housing member for engaging the engaging fitting of said workpiece;
- a first elongated tubular member affixed at a first end to said housing member wherein said first elongated shape memory metal alloy member is disposed within said first tubular member;
- a first end fitting for fixedly connecting respective second ends of said first elongated shape memory metal alloy member and said first tubular member to each other;
- a second elongated tubular member affixed at a first end to said housing member wherein said second elongated shape memory metal alloy member is disposed within said second tubular member;
- a second end fitting for fixedly connecting respective second ends of said second elongated shape memory metal alloy member and second tubular member to each other, wherein the returning of either one of said first and second elongated shape memory metal alloy members to its undeformed length releases the workpiece; and
- heating means coupled to said first and second shape memory metal alloy members for heating said members to said transition temperature.

15. The release device of claim 14 wherein said alloy is 55-Nitinol.

16. The release device of claim 14 wherein the engaging feature of at least one of said first and second elongated members has a shape for releasing tension gradually.

17. A release device for releasing a workpiece having an enlarged engaging fitting thereon comprising:
- a housing member having a cavity for receiving the engaging fitting of said workpiece and having a bore communicating with said cavity;
- first and second elongated shape memory metal alloy members each having an elongated direction, said first elongated shape memory metal alloy member having been deformed by increasing its length along its elongated direction and capable of returning to an undeformed length when heated to a transition temperature, said second elongated shape memory metal alloy member having been deformed by decreasing its length along its elongated direction and capable of returning to an undeformed length when heated to a transition temperature, said first elongated shape memory metal alloy member having on a first end a recessed engaging feature adapted for engaging the engaging fitting of the workpiece and being disposed in the bore of said housing member for engaging the engaging fitting of the workpiece;
- means for affixing said second elongated shape memory metal alloy member at a first end to said housing member and arranged for having the respective elongated directions of said first and second elongated shape memory metal alloy members disposed along substantially parallel axes;
- a first end fitting for substantially fixedly connecting respective second ends of said first and second elongated shape memory metal alloy members, wherein the returning of either one of said first and second elongated shape memory metal alloy members to its undeformed length releases the workpiece; and
- heating means coupled to said first and second elongated shape memory metal alloy members for heating said members to said transition temperature.

18. The release device of claim 17 wherein said second elongated shape memory metal alloy member has a longitudinal bore therethrough and wherein said first elongated shape memory metal alloy member is disposed within said longitudinal bore, whereby said first and second elongated shape memory metal alloy members are substantially coaxial.

19. The release device of claim 17 wherein said alloy is 55-Nitinol.

20. The release device of claim 17 wherein the engaging feature of at least one of said first and second elongated members has a shape for releasing tension gradually.

* * * * *